United States Patent [19]

Diez et al.

[11] Patent Number: 5,695,200
[45] Date of Patent: Dec. 9, 1997

[54] METALLIC CYLINDER HEAD GASKET WITH ROUNDED DEFORMATION LIMITER

[75] Inventors: Armin Diez, Lenningen; Hermann Randecker, Dettingen, both of Germany

[73] Assignee: Elring Klinger GmbH, Dettingen, Germany

[21] Appl. No.: 565,108

[22] Filed: Nov. 30, 1995

[30] Foreign Application Priority Data

Jun. 7, 1995 [DE] Germany ............ 195 20 695.9

[51] Int. Cl.⁶ .................................. F16J 15/08
[52] U.S. Cl. ....................... 277/180; 277/235 B
[58] Field of Search ..................... 277/180, 233, 277/235 B

[56] References Cited

U.S. PATENT DOCUMENTS

| 3,467,398 | 9/1969 | Bernard | 277/180 |
| 5,076,592 | 12/1991 | Pearlstein | 277/180 |
| 5,205,566 | 4/1993 | Ueta et al. | 277/180 |
| 5,286,039 | 2/1994 | Kawaguchi et al. | 277/180 |
| 5,338,046 | 8/1994 | Willis, Jr. et al. | 277/180 |
| 5,522,604 | 6/1996 | Weiss et al. | 277/180 |

FOREIGN PATENT DOCUMENTS

| 0 230 804 | 8/1987 | European Pat. Off. | |
| 574770 | 12/1993 | European Pat. Off. | 277/235 B |
| 627581 | 12/1994 | European Pat. Off. | 277/235 B |
| 633396 | 1/1995 | European Pat. Off. | 277/235 B |
| 4-15372 | 1/1992 | Japan | 277/235 B |

*Primary Examiner*—Scott Cummings
*Attorney, Agent, or Firm*—Alix, Yale & Ristas, LLP

[57] ABSTRACT

The invention relates to a metallic cylinder head gasket for an internal combustion engine, having a carrier plate which is arranged between cover plates. The carrier plate and cover plates are provided with passages which are commensurate with the combustion chambers of the internal combustion engine. The cover plates are provided, around each passage, with a resilient bead. Adjacent to each bead, and also extending around each passage, is a bead deformation limiter. The deformation limiters are shaped to prevent the occurrence of high edge pressures.

14 Claims, 3 Drawing Sheets

METALLIC CYLINDER HEAD GASKET WITH ROUNDED DEFORMATION LIMITER

FIELD OF THE INVENTION

The present invention relates to the manufacture of cylinder head gaskets for internal combustion engines and, particularly, to the formation of carrier plates for such gaskets. More specifically, this invention is directed to metallic cylinder head gaskets and, especially, to multilayer gaskets having a carrier plate which includes a deformation limiter. Accordingly, the general objects of the present invention are to provide novel and improved methods and articles of such character.

BACKGROUND OF THE INVENTION

Published European Patent Documents EP-C-0 306 766 and EP-C-0 230 804 disclose metallic cylinder head gaskets for internal combustion engines. These prior art gaskets comprise a carrier plate which cooperates with at least one cover plate, the cover plate having resilient beads, i.e., deformations, which function as sealing rings. The gap at any point between the cylinder head and cylinder block of an internal combustion engine varies during operation as a function of the working cycle of the adjacent cylinder. The cylinder head gasket, which must seal this variable gap, is subjected to constant changes in pressure and must have permanent resilient properties in order to maintain a satisfactory seal.

The seal established by the gaskets of the above-identified references is created by upward extensions of the cylinder head gasket, such extensions being disposed about the combustion spaces, and the beads. The beads act as spring elements and follow vertical relative movements of the cylinder head in relation to the cylinder block which occur as a result of cylinder pressure variations. On the one hand, no unacceptably large deformation of a sealing bead must occur when the bead is subjected to maximum load. On the other hand, the relief of the applied, i.e., clamping, force must not be complete but rather only take place to such an extent that a minimum deformation occurs. The working range of the bead lies between these two limit points of the deformation.

In order to ensure proper functioning thereof, the beads must not be completely deformed either during the installation of the gasket or in the operating state. An unacceptably large deformation of a bead vertically with respect to the plane of the gasket is prevented in known gaskets by means of a deformation limiter of constant thickness. The deformation limiters also serve to extend the gasket upwardly along the combustion space.

Translatory movements can occur between the cylinder block and the cylinder head when these engine components have different coefficients of thermal expansion, a cast iron block combined with a light weight, i.e., aluminum, metal head, for example. Translatory movements can also occur if the cooling conditions are different. Translatory movements lead to erosion created leakage paths, particularly on the cylinder head.

Published German Patent Document DE-A-4 219 709 discloses deformation limiters of rectangular cross-section produced by extrusion or heading. In the case of extrusion produced limiters, since the material being worked flows in all directions and not only in the desired direction, there are large material stresses with a so-called "frog effect" corresponding to a frog spring. For products formed by heading, a conical die is required. Use of such a die leads to uneven edges and the method is unsuitable for mass production since the product is not formed with precise repeatability.

Therefore, an object of the invention is to provide a metallic cylinder head gasket, and a method of fabrication thereof, in which the maximum acceptable deformation of the bead is not exceeded even over relatively long operation.

Another object of the invention is to provide a metallic cylinder head gasket designed to eliminate the formation of leakage channels in the cylinder head.

SUMMARY OF THE INVENTION

The above-stated and other objects of the invention are achieved through the manufacture of a novel metallic cylinder head gasket for an internal combustion engine, the gasket having two outer cover "plates" and a carrier "plate" which is sandwiched between the cover plates. The plates are provided with one or more combustion space passages, which are arranged one next to the other, commensurate with the combustion chambers of an internal combustion engine. Each of the cover plates is provided, in the regions which extend around each combustion space passage, with a generally annular shaped "bead". These resilient beads, in the form of arcuate deformations which extend towards the carrier plate, on the two cover plates are generally in registration. The beads are spaced from, i.e., set back from the edges of, associated combustion space passages. This spacing leaves a straight carrier plate section about the periphery of each passage. To protect each bead, an inner deformation limiter is provided adjacent to the bead, the deformation limiters also extending around each combustion space passage.

The inner deformation limiters are provided, on the side thereof which faces the combustion space passage, at the edges facing the cover plates, with rounded portions of sufficient radius to ensure that no high edge pressures occur. By virtue of the avoidance of high edge pressure, leakage channels resulting from translatory movements between the cylinder block and cylinder head are eliminated.

Gaskets in accordance with the invention can be manufactured without large financial outlay for specialized equipment and without additional components. During manufacture, a convex shape may easily be imparted to both sides of the deformation limiter.

Further refinements of a gasket in accordance with the invention, and in the methods for forming the deformation limiters, will become apparent to those skilled in the art from the description below of the disclosed embodiments.

BRIEF DESCRIPTION OF THE DRAWINGS

The invention is explained in greater detail below with reference to exemplary illustrated embodiments. In the drawings, like reference numerals refer to like elements in the figures and.

DETAILED DESCRIPTION OF THE DISCLOSED EMBODIMENTS

Figure 1:
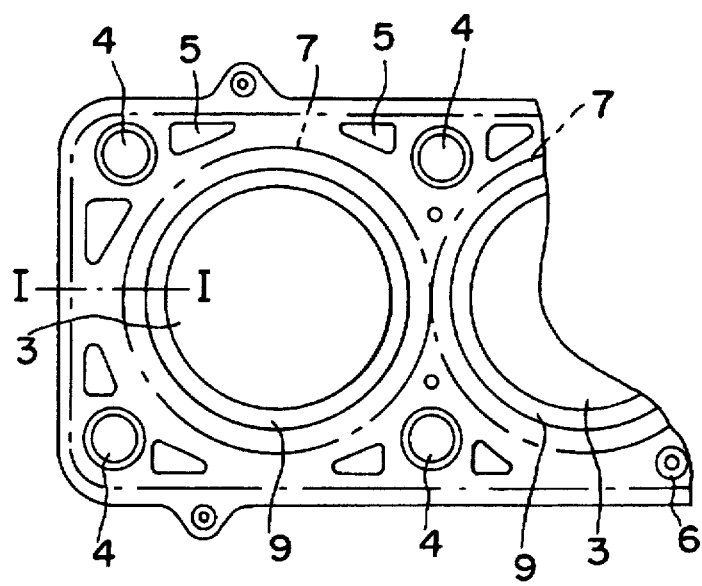
FIG. 1 is a partial schematic plan view of a portion of a cylinder head gasket in accordance with a first embodiment of the invention.
Figure 2:
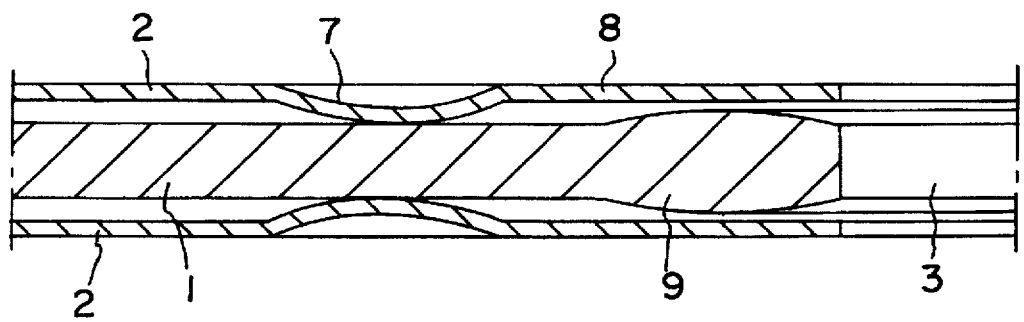
FIG. 2 is a cross-sectional view of the head gasket of FIG. 1 taken along the line I—I.

The multilayer, metallic cylinder head gasket illustrated in FIGS. 1 and 2 comprises an intermediate carrier member 1, in the form of a generally planar sheet or plate, disposed between a pair of identical cover plates 2. The gasket, comprising the carrier plate 1 and the cover plates 2, defines a series of combustion space passages 3 which correspond to the cylinder bores of the internal combustion engine on which the gasket is to be installed. The gasket further defines holes 4 for the bolts which are used to clamp the cylinder head to the engine block. The gasket also defines openings 5, 6 through which coolant and oil will flow.

The cover plates 2 are usually manufactured from thin sheets of spring steel. The cover plates 2 are provided with resilient beads 7 which extend around, and are spaced from, the combustion space passages 3. The spacing or set back of each bead 7 leaves an annular, straight plate section or rim 8 in the edge area of each combustion space passage 3. The beads 7 are in the form of arcuate deformations of the sheet material which extend in the direction of the carrier plate 1. The beads 7 on the two cover plates 2 are generally in registration.

In addition, half-beads (not illustrated) are usually provided on the cover plates 2 around the openings 5, 6 and the bolt holes 4.

The carrier plate 1, which is otherwise planar, is provided with a deformation limiter 9 in the peripheral area which extends about each of the combustion space passages 3. These deformation limiters are for the purpose of protecting an adjacent bead 7 against excessive compressive stress. With reference to FIG. 2, a deformation limiter 9 is in the form of a thickened portion of the carrier plate 1 adjacent to the edge of the combustion space passage 3 and outside of the bead area, i.e., between the bead 7 and the combustion space passage 3 which the bead seals. The deformation limiter 9 is provided with a convex surface on both sides. The deformation limiter 9 is formed in such a way that it extends out of the plane of plate 1 approximately the same distance toward each of the cover plates 2. Accordingly, deformation limiter 9 has the same effect on the beads 7 on each of the cover plates 2.

The thickness of the deformation limiter 9 is chosen such that the straight plate sections 8 of the cover plates 2 come to rest on the deformation limiter 9 when the gasket is clamped between the engine block and cylinder head, i.e., at the same time the beads 7 are pressure-loaded. A serial, i.e., double seal is thus established. Also, as a result of the convex construction of the deformation limiter 9, high edge pressures are avoided. High edge pressures lead to leakage channels, particularly in the case of aluminum components, as a result of translatory movements between the cylinder head and cylinder block.

Figure 3:
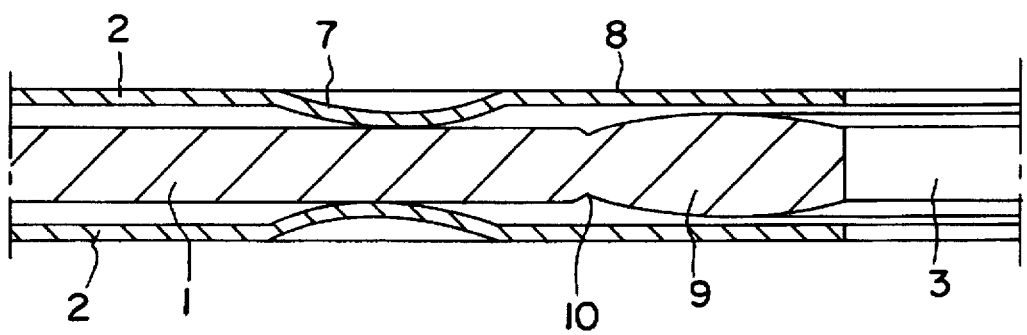
FIG. 3 is a cross-sectional view of a gasket in accordance with a second embodiment of the invention.

In the embodiment of FIG. 3, the carrier plate 1 is provided on each of its two opposed surfaces with a notch 10. The notches 10 are located between the deformation limiter 9 and the beads 7 and extend around the deformation limiter 9. As disclosed below, the notches 10 are provided for reasons of the manufacturing process.

Figure 4:
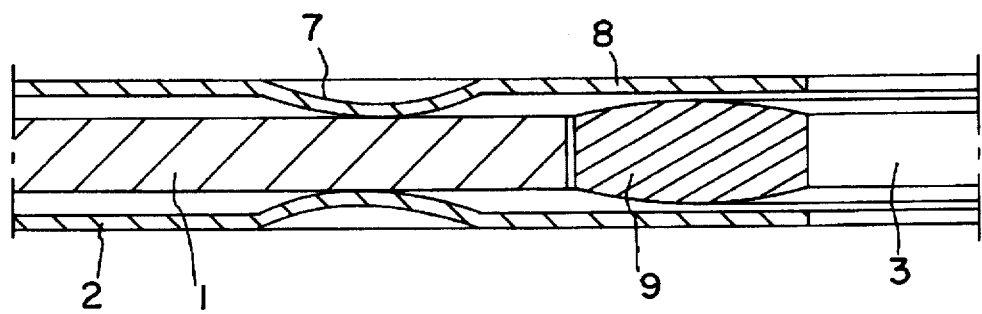
FIG. 4 is a cross-sectional view of a gasket in accordance with a third embodiment of the invention.

With reference to FIG. 4, in yet another embodiment of the invention, the annular deformation limiter 9 is constructed separately from the carrier plate 1. The deformation limiter defining member, in the form of a ring 9, is inserted between the cover plates 2 and into a cut-out of the carrier plate 1 of an appropriate size.

Figure 5:
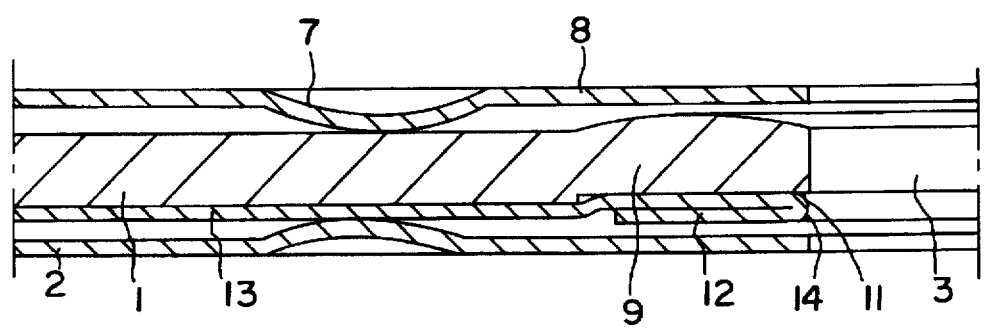
FIG. 5 is a cross-sectional view of a gasket in accordance with a fourth embodiment of the invention.

With reference to FIG. 5, in still another embodiment of the invention, the deformation limiter 9 is partially formed integrally with the carrier plate 1. Thus, the integral portion of deformation limiter 9 is formed on one side of plate 1, typically the side which faces towards the cylinder head in the installed state of the gasket, and has a convex surface. The opposite side of the plate 1, in the region of deformation limiter 9, is provided with an annular, step-shaped recess 11. An additional intermediate plate 13, having a folded-over section 12, is partly received in the recess 11. The intermediate plate 13 is sandwiched between the carrier plate 1 and the surface of the cover plate 2 which faces the step-shaped recess 11. The folded-over section 12 defines a rounded edge portion 14 which faces passage 3 for reducing the edge pressures.

The deformation limiter 9 determines the limit points of the bead working range according to prescribed operating points. It is possible for vertical and/or width profiling of the deformation limiter 9 to be provided along the circumference of the combustion space passage 3 for the purpose of adapting it to prescribed operating points.

In areas adjacent to the bolt holes 4, given vertical profiling, the height of the deformation limiter 9 will be less than in the areas located intermediate the points of clamp pressure application. Furthermore, given width profiling, in the area adjacent to the bolt holes 4, the width of the deformation limiter 9 is less than in the intermediate areas.

In further embodiments, instead of directly varying the width of the deformation limiter 9, the support area of the cover plates 2 can also be varied by means, for example, of a correspondingly oval cutout for the combustion space passage 3.

If appropriate, the bead working range can also be homogenized by corresponding deepening and/or increasing of the height of the carrier plate 1 in the bead contact area.

Also, if appropriate, the straight cover plate sections 8 can be made to extend only partially over the deformation limiter 9 or, when clamped, be terminated behind the deformation limiter 9.

Figure 6:
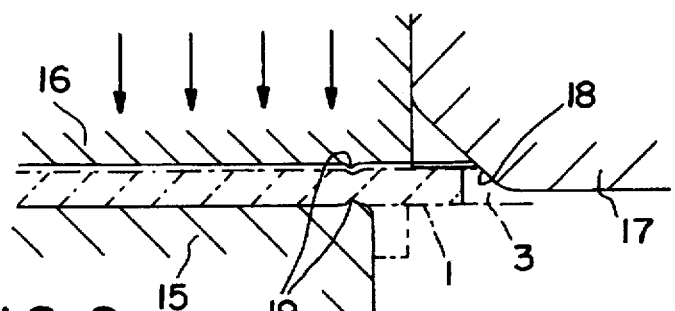
FIG. 6 is a cross-sectional view, partially in phantom, schematically illustrating an initial step in a method for manufacturing a gasket carrier plate in accordance with the invention.
Figure 7:
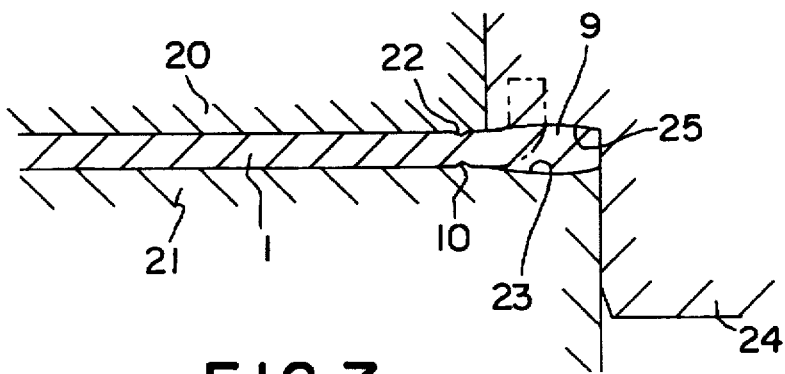
FIG. 7 is a cross-sectional view, partially in phantom, of a manufacturing step performed subsequent to the step of FIG. 6.

With reference to FIGS. 6 and 7, the manufacture of an inner deformation limiter 9 constructed integrally with the carrier plate 1 is illustrated. First, the combustion space passages 3 are provided in the carrier plate 1 in such a manner as to leave a rim which extends into the area of each passage 3. Next, the carrier plate 1 is clamped between a drawing die 15 and a drawing block 16. The drawing block 16 is pressed, for example with strong spring pressure or hydraulically, against the drawing die 15. In the edge area of each combustion space passage 3, the drawing block 16 protrudes beyond the edge of the drawing die 15 by approximately the thickness of the wall of the carrier plate 1. The protrusion of the drawing block 16 serves to guide a drawing punch 17 which has a bevelled guide edge 18. The drawing punch 17 deforms the rim portion of the carrier plate 1 at an angle of approximately 90° with respect to the plane of the carrier plate. During this deformation, the bevelled guide edge 18 prevents the carrier plate 1 from tapering or from being pulled out from between the drawing die 15 and drawing block 16. The immobilization of carrier plate 1 is expediently aided by projections 19 on the drawing die 15 and the drawing block 16 which extend around and are located adjacent to the area which will be occupied by the deformation limiter 9. The projections 19 form the notches 10 (see FIG. 3) by penetrating into the material of the carrier plate 1.

The carrier plate 1 is subsequently clamped between a stamping plate 20 and a stamping die 21. Projections 22 on the stamping plate 20 and stamping die 19 correspond to the projections 19 of the drawing block 16 and drawing die 15. The projections 22 thus engage the notches 10. In the area of the combustion space passages 3, the stamping die 21 protrudes beyond the stamping block 20 according to the desired final radius of the deformation limiter 9. The stamping die 21 is provided with a stamping face 23 in accordance with the desired shape of the deformation limiter 9 which is, for example, convex. By means of a stamping punch 24, the previously folded rim portion edge is stamped to form the final deformation limiter 9. The stamping punch 24 is provided with a stamping face 25 corresponding to the stamping face 23. Deformation limiters 9 as shown in FIGS. 2, 3 and 5 can be manufactured as depicted in FIGS. 6 and 7 relative to passage 3 with simultaneous vertical profiling and/or width profiling. The material of the carrier plate 1 is prevented from flowing back, i.e., radially outwardly during the stamping, by the projections 22.

Figure 8:
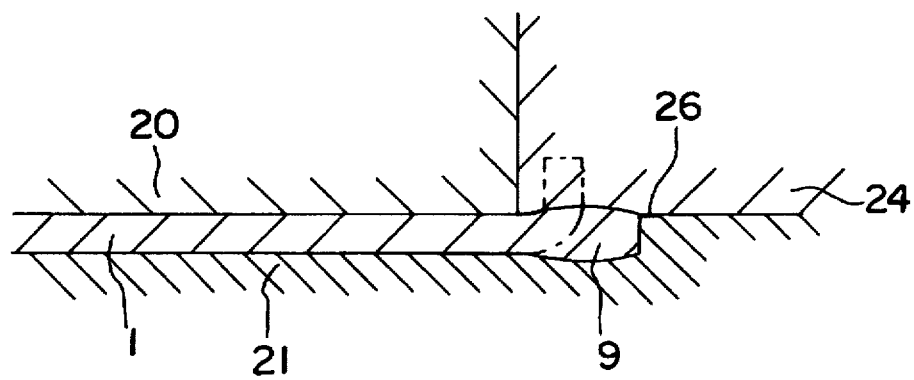
FIG. 8 is a cross-sectional view schematically illustrating an alternative method of manufacturing a carrier plate for a gasket in accordance with the invention.

With reference to FIG. 8, the stamping die 21 can also define the entire negative shape of the carrier plate 1 including the associated deformation limiter or limiters 9. The stamping punch 24 forms the desired shape by moving onto the stamping die 21. In order to absorb possible excess material, a circumferential recess 26 of very little height can be provided adjacent to the upper inner edge of the stamping die 21. The recess 26 can give rise to an easily removable burr of excess material at the deformation limiter 9.

Figure 9:
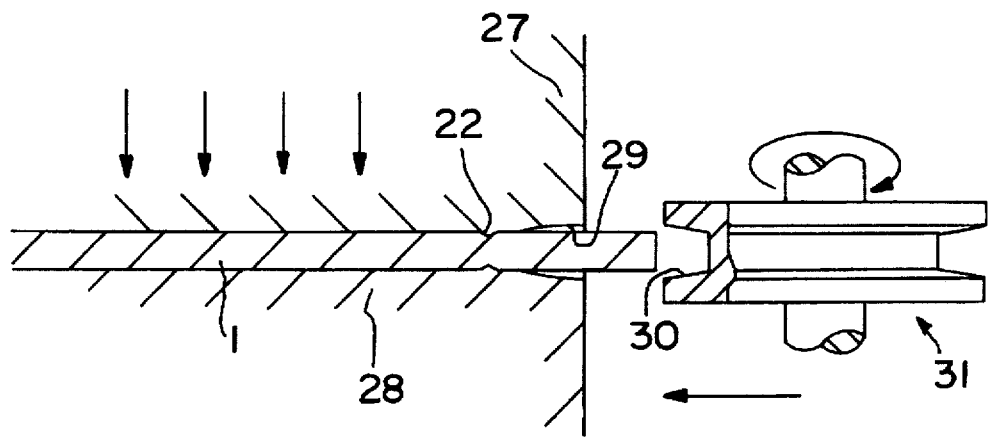
FIG. 9 is a partial cross-sectional view of a step of a further alternative method of manufacturing a head gasket in accordance with the invention.
Figure 10:
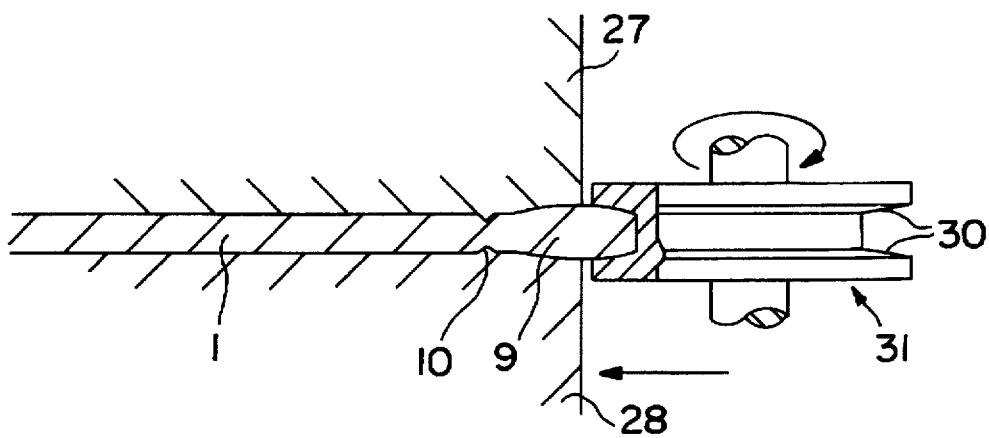
FIG. 10 is a partial cross-sectional view of a subsequent step in the performance of the method of FIG. 9.

With reference to FIGS. 9 and 10, it is also possible to produce the deformation limiters 9 by rolling. In such a process, the carrier plate 1 is clamped between two plates 27, 28. The plates 27, 28 may also have projections 22 for the same purpose as described above. The plates 27, 28 terminate flush with one another in the area of the combustion space passage 3. The carrier plate 1 protrudes outward beyond the termination of plates 27, 28. The plates are provided with shaping faces 29 adjacent to the inner edge. One or more rolling tools 31, provided with shaping faces 30, are used to form the deformation limiter 9 with a desired cross-sectional shape.

The deformation limiter 9 of the embodiment in FIG. 4 is preferably produced from wire rings which initially have a round or rectangular cross-sectional shape. The wire rings are given a convex form on both sides by stamping.

While preferred embodiments have been shown and described, various modifications and substitutions may be made thereto without departing from the spirit and scope of the invention. Accordingly, it is to be understood that the present invention has been described by way of illustration and not limitation.

We claim:

1. A metallic cylinder head gasket for use between the engine block and cylinder head of an internal combustion engine, the engine having at least a first combustion chamber which defines an axis, said gasket comprising:

a pair of cover plates, each of said cover plates defining a plane, said cover plates each being provided with at least a first passage therethrough, said passages being commensurate in cross-sectional area and shape with the combustion chamber of an internal combustion engine, said passages being defined by an edge surface which is oriented substantially perpendicular to the cover plate defined plane, said cover plates each being further provided with a resilient bead extending around and offset from said passage, a planar plate section extending between each said passage and the surrounding bead, said beads extending outwardly from said plates in opposite directions whereby the bead on each one of said plates constitutes a convex resilient projection extending toward the other of said plates;

a carrier plate disposed between said cover plates, said carrier plate defining a plane which is generally parallel to said cover plate defined planes and having a pair of oppositely disposed surfaces which are respectively contacted by said resilient beads of said cover plates; and a deformation limiter disposed between said cover plates, said deformation limiter being intercepted by said plane defined by said carrier plate and having a pair of opposite sides and a passage extending between said sides, said deformation limiter passage being in registration with said cover plate first passages, said deformation limiter passage being defined by an edge surface which is at least in part substantially parallel to said cover plate first passage edge surfaces, said parallel passage edge surfaces also being substantially parallel to the axis of a combustion chamber when said gasket is installed between an engine block and cylinder head, said deformation limiter being of solid construction, at least one of said sides of said deformation limiter in the portion thereof which adjoins said edge surface and is in direct communication with said passage being rounded, said portion of said deformation limiter which includes said rounded side having a thickness which exceeds the minimum spacing between said cover plate oppositely directed beads, said deformation limiter portion which includes said rounded side circumscribing the deformation limiter defined passage, said rounded side having sufficient radius to preclude the establishment of any line of contact between said deformation limiter and said cover plates which may result in the creation of high edge forces in either of said cover plates, a first continuous seal being established between said cover plate beads and said carrier plate and a second seal which is coaxial with said first seal being established between said deformation limiter and said cover plates in response to pressure induced distortion of said beads.

2. The gasket of claim 1 wherein said deformation limiter is rounded on both sides thereof in said portion which adjoins said edge surface.

3. The gasket of claim 4 wherein said deformation limiter has a recess which partially receives the folded portion of said intermediate plate.

4. The gasket of claim 1 further comprising:

an intermediate plate disposed between a first of said cover plates and said carrier plate, said intermediate plate having a folded portion defining a passage in registration with said deformation limiter edge surface.

5. The gasket of claim 1 wherein said deformation limiter is integral with said carrier plate.

6. The gasket of claim 1 wherein said deformation limiter is separate from said carrier plate and is inserted between said cover plates adjacent to a said passage.

7. The gasket of claim 6 wherein said deformation limiter is formed from a wire ring.

8. The gasket of claim 1 wherein said deformation limiter is profiled in accordance with a uniform distribution of forces in the edge area of each of said passages and the working range of said beads is homogenized by adjusting the height of said carrier plate where it contacts said beads.

9. The gasket of claim 1 wherein said planar plate sections extend at least partially over said deformation limiter.

10. The gasket of claim 1 wherein said planar cover plate sections have an outer diameter determined by said beads which is greater than the maximum diameter of said deformation limiter as defined by the portion thereof which includes said rounded side.

11. The gasket of claim 1 wherein the mid-point of the thickness of said deformation limiter is located approximately midway between said cover plates and approximately on said plane defined by said carrier plate.

12. The gasket of claim 2 wherein said planar cover plate sections have an outer diameter determined by said beads which is greater than the maximum diameter of said deformation limiter as defined by the portion thereof which includes said rounded side.

13. The gasket of claim 12 wherein said deformation limiter is integral with said carrier plate.

14. The gasket of claim 12 wherein said deformation limiter is separate from said carrier plate and is inserted between said cover plates adjacent to said passage.

* * * * *